(12) United States Patent
Palmer

(10) Patent No.: US 10,035,545 B2
(45) Date of Patent: Jul. 31, 2018

(54) SIDE SILL FOR A MOTOR VEHICLE WITH A SILL PANEL

(71) Applicant: Dr. Ing. h.c. F. Porsche Aktiengesellschaft, Stuttgart (DE)

(72) Inventor: Eberhard Palmer, Vaihingen/Enz (DE)

(73) Assignee: Dr. Ing. h.c. F. Porsche Aktiengesellschaft (DE)

(*) Notice: Subject to any disclaimer, the term of this patent is extended or adjusted under 35 U.S.C. 154(b) by 205 days.

(21) Appl. No.: 15/019,226

(22) Filed: Feb. 9, 2016

(65) Prior Publication Data

US 2016/0257347 A1    Sep. 8, 2016

(30) Foreign Application Priority Data

Mar. 3, 2015  (DE) .................. 10 2015 103 006

(51) Int. Cl.
   *B62D 25/02*    (2006.01)
(52) U.S. Cl.
   CPC .................. *B62D 25/025* (2013.01)
(58) Field of Classification Search
   CPC .................................................. B62D 25/025
   USPC ........................................................ 296/209
   See application file for complete search history.

(56) References Cited

U.S. PATENT DOCUMENTS

| | | | | |
|---|---|---|---|---|
| 3,596,979 A * | 8/1971 | Hablitzel | ............. | B62D 29/046 296/181.2 |
| 5,190,803 A * | 3/1993 | Goldbach | ........... | B29C 37/0085 264/261 |
| 6,171,543 B1 * | 1/2001 | Hirose | ................ | B29C 45/1704 264/572 |
| 2002/0109263 A1 * | 8/2002 | Goldbach | ......... | B29C 45/14467 264/271.1 |
| 2004/0185223 A1 * | 9/2004 | Yamamoto | .......... | B29C 45/1704 428/99 |
| 2007/0190294 A1 * | 8/2007 | Yamamoto | ............. | B29C 33/44 428/174 |
| 2009/0223738 A1 * | 9/2009 | Nakamura | ........... | G10K 11/172 181/175 |
| 2010/0081354 A1 * | 4/2010 | Shipley | .................. | D04H 18/02 442/407 |
| 2014/0049067 A1 * | 2/2014 | Kasuya | ................. | B60R 13/043 296/146.5 |

FOREIGN PATENT DOCUMENTS

| | | | | |
|---|---|---|---|---|
| CN | 101987600 A | | 3/2011 | |
| DE | 1 655 650 | | 8/1971 | |
| DE | 3429839 A1 * | | 4/1986 | ............. B62D 23/00 |
| DE | 10 2010 014 574 | | 10/2011 | |
| EP | 0266514 A2 * | | 5/1988 | ............. B60J 5/101 |
| FR | 1595954 A * | | 6/1970 | ........... B62D 29/046 |

* cited by examiner

*Primary Examiner* — Hilary L Gutman
(74) *Attorney, Agent, or Firm* — Gerald E. Hespos; Michael J. Porco; Matthew T. Hespos

(57) ABSTRACT

The sill panel is of multi-part design and consists of a lower sill panel part facing the carriageway and composed of nonwoven fabric (LWRT) and of an upper adjoining sill panel part composed of plastic (PTT). The two sill panel parts are connected to each other by means of an edge-side overlap which is adhesively bonded or welded.

5 Claims, 2 Drawing Sheets

SIDE SILL FOR A MOTOR VEHICLE WITH A SILL PANEL

CROSS REFERENCE TO RELATED APPLICATION

This application claims priority under 35 USC 119 to German Patent Appl. No. 10 2015 103 006.3 filed on Mar. 3, 2015, the entire disclosure of which is incorporated herein by reference.

BACKGROUND

1. Field of the Invention

The invention relates to a side sill for a motor vehicle.

2. Description of the Related Art

DE 10 2010 014 574 A1 discloses a vehicle body with side sills, the lower parts of which are bonded adhesively to side sill sections to form a closed hollow profile. Furthermore, DE 1 655 650 discloses a two part side sill for vehicles where the parts are connected to each other by adhesive bonding.

It is an object of the invention to provide a side sill for a motor vehicle, with a lightweight sill panel that acts in an acoustically active manner against stone impact.

SUMMARY

The invention relates to a sill panel that reduces the weight of the conventional sill panel. The sill panel of the invention comprises plastic and reduces stone impact noises. The multi-part sill panel has a first, lower sill panel part that faces a roadway. The lower sill panel is composed of an acoustically active nonwoven fabric. The multi-part sill panel further has an upper, second sill panel part composed of plastic. The upper and lower sill panel parts are joined together at flat overlap parts. In particular, mutually facing free side edges of the two panel parts have extensions that lie overlapping one another in face-to-face contact in a planar manner with one on the other and are connected to each other.

The connection of the extensions takes place, for example, via retrospective welding or adhesive bonding of the overlap. The further panel part that is composed of a nonwoven fabric is fit in the panel part composed of plastic, thereby achieving a simple mounting that achieves an acoustically active measure for reducing stone impact noises that arise due to stones or the like being thrown up from the roadway against the sill. Therefore, additional acoustic measures can be dispensed with. In addition, the nonwoven material (LWRT) "Lightweight Reinforced Thermoplastic" achieves a weight advantage in comparison to a panel that is composed completely of plastic and that has bitumen sound absorption mats to reduce noise.

The overlapping connection is achieved by side edge extensions of the two panel parts and creates a stable connection since an obtuse connection of the panel parts reacts very sensitively to bending.

The overlapping extension of the first panel part, which is composed of nonwoven fabric, may lie on the inside of the extension of the second panel part and has an offset so that the outer surfaces of the two panel parts are flush with each other. The resulting, continuous outer surface of the two sill panel parts results in an aesthetically attractive smooth outer surface that is visible on the side sill from the outside.

A plurality of transversely running sprues for the first panel part, which is composed of nonwoven fabric, are arranged on the sill panel part composed of plastic. The sill panel part that is composed of nonwoven fabric and faces the roadway is held in a connecting manner by the sprues.

One of the panel parts may be insert molded on the other panel part.

An exemplary embodiment of the invention is illustrated in the drawings and is described in more detail below.

DETAILED DESCRIPTION

Figure 1:
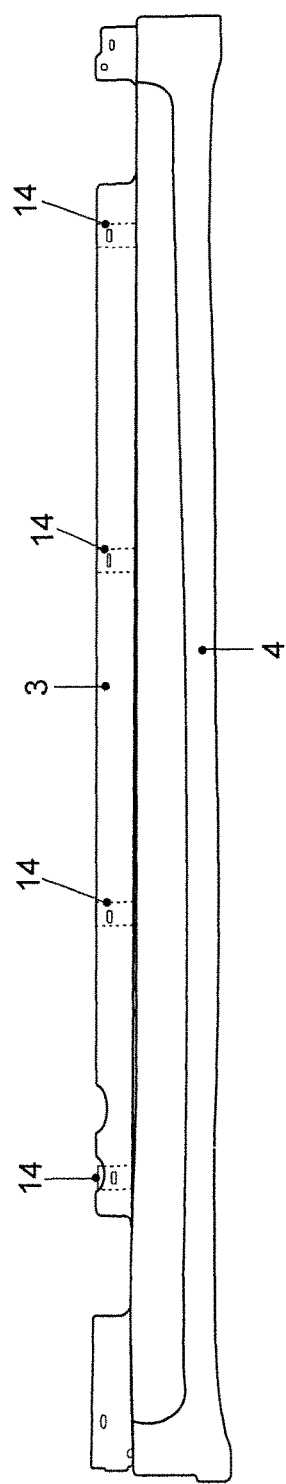
FIG. 1 shows a multi-part sill panel, as seen from the outside.

A side sill 1 of a motor vehicle comprises an outer sill panel 2 that is of multi-part design, and includes a first sill panel part 3 composed of an acoustically active nonwoven material (LWRT). The first panel part 3 faces the roadway 6 and is connected to an adjoining, second sill panel part 4 composed of plastic (PTT). The connection of the two panel parts takes place by means of a flat overlap 5.

Figure 3:
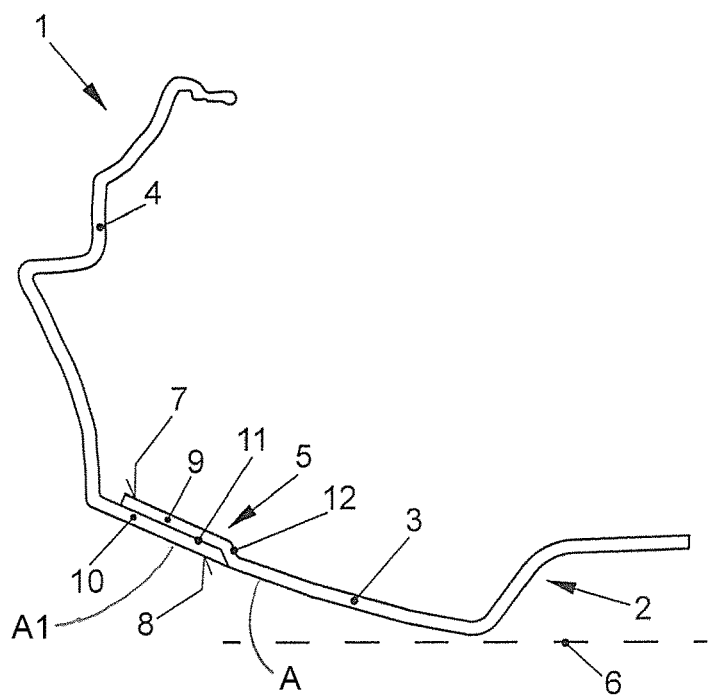
FIG. 3 shows a section according to the line III-III of FIG. 2 through the two-part sill panel between the sprues.

The mutually facing free side edges 7, 8 of the two panel parts 3, 4 have extensions 9, 10 that lie in a planar manner one on the other for an overlapping connection to each other (FIG. 3).

The connection of the planar extensions 9, 10 of the two panel parts 3, 4 of the sill 1 on one another takes place, for example, via retrospective welding or via adhesive bonding 11 of the overlap.

The overlapping extension 9 of the first sill panel part 3, which is composed of nonwoven fabric, is inward of the extension 10 of the second panel part and has an offset 12. The offset serves to orient the outer surfaces A and A1 of the two panel parts 3, 4 in a manner running flush with respect to each other.

Figure 2:
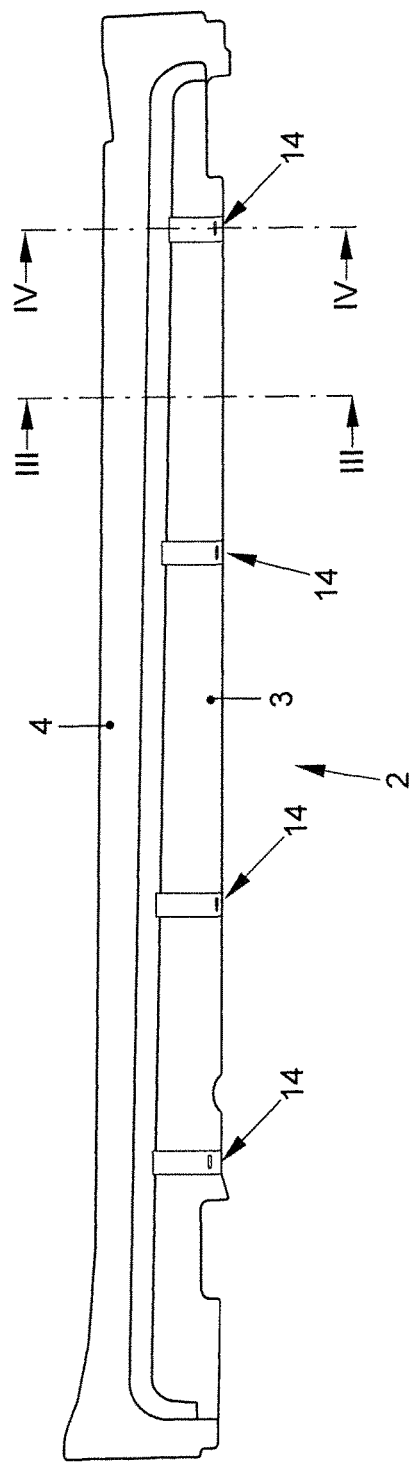
FIG. 2 shows the multi-part sill panel, as seen from the inside, with sprues.
Figure 4:
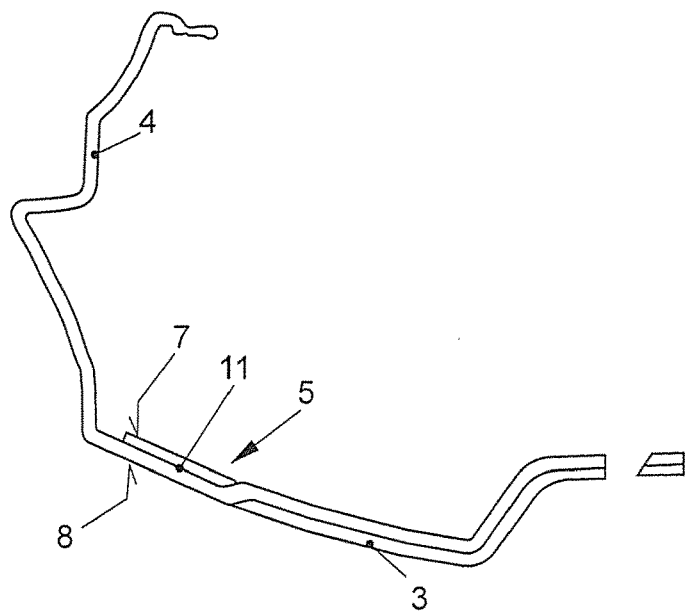
FIG. 4 shows a section according to the line IV-IV of FIG. 2 through the two-part sill panel with an overlapping connection by means of the sprues.

The second panel part 4, which is composed of plastic, has a plurality of transversely running "sprues" 14 for the first panel part 4, which is composed of nonwoven fabric (FIGS. 1 and 2), as illustrated in more detail in FIG. 4.

One of the panel parts 3 or 4 can be insert molded on the other panel part 4 or 3.

What is claimed is:

1. A side sill for a motor vehicle, with an outer sill panel of profiled cross section, the outer sill panel being of multi-part design and comprising: a lower first sill panel part that faces a roadway and is composed of a light weight reinforced thermoplastic (LWRT) that is acoustically active for reducing stone impact noise, the first sill panel part being connected to an upper second sill panel part composed of plastic (PTT), the first sill panel part being joined to the second sill panel part at a flat overlap formed by a planar extension of the second sill panel part and an offset planar extension of the first sill panel part, the offset planar extension of the first sill panel part being secured in face-to-face contact with an inwardly facing surface of the planar extension of the second sill panel part and so that an outer surface of the planar extension of the second sill panel part is flush with an outer surface of the first sill panel part adjacent the offset planar extension of the first sill panel part.

2. The side sill of claim 1, wherein the connection of the planar extensions of the first and second panel parts takes place via a retrospective welding or adhesive bonding.

3. The side sill of claim 1 the first sill panel part comprises nonwoven fabric.

4. The side sill of claim 1, wherein the second sill panel part has a plurality of transversely running sprues for the first sill panel part.

5. The side sill of claim 1, wherein the first panel part or the second panel part is insert molded on the second panel part or on the first panel part.

* * * * *